US007130826B1

(12) United States Patent
Lenchner

(10) Patent No.: US 7,130,826 B1
(45) Date of Patent: Oct. 31, 2006

(54) METHOD AND APPARATUS FOR CONDUCTING COINLESS TRANSACTIONS

(75) Inventor: Jonathan Lenchner, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 09/712,380

(22) Filed: Nov. 13, 2000

(51) Int. Cl.
*Q06Q 40/00* (2006.01)
(52) U.S. Cl. ............... 705/39; 705/16; 705/36; 705/417; 273/138.2; 364/467
(58) Field of Classification Search ........... 705/417, 705/16; 364/467; 345/694; 273/138.2; 347/19
See application file for complete search history.

(56) References Cited

U.S. PATENT DOCUMENTS

| 3,122,312 | A | * | 2/1964 | Sante ................. 235/61 R |
| 5,274,561 | A | * | 12/1993 | Adams et al. ............. 705/417 |
| 5,620,182 | A | * | 4/1997 | Rossides ................. 273/138.2 |
| 5,869,826 | A | | 2/1999 | Eleftheriou ............... 235/380 |

FOREIGN PATENT DOCUMENTS

WO    WO 98/29793    *    7/1998

OTHER PUBLICATIONS

Walter C. Jones, Aug. 3, 1999 "Collectors picking up the cent Pennies are getting to be in real demand", Florida times, Jacksonville.*

Raymond J. Barber, Jr., 1947 "Does Your Accounting Make Cents", National Association of Cost Accounting..*

Deitel & Deitel "C++ How to Program", Prentice-Hall, Inc., 1998; ISBN 0-13-528910-6.*

McCullough et al "The Numerical Reliability of Econometric Software", Journal of Economic Literature, vol. 37, No. 2. (Jun. 1999), pp. 633-665.*

Scott Sumner "Privatizing the Mint", Journal of Money, Credit and Banking, vol. 25, No. 1. (Feb. 1993), pp. 13-29.*

* cited by examiner

*Primary Examiner*—Ella Colbert
*Assistant Examiner*—Harish T. Dass

(57) ABSTRACT

A method and apparatus are disclosed for facilitating coinless transactions by rounding a fractional transaction cost up or down to a whole-unit amount. A fractional transaction cost is rounded up or down to a whole-unit amount based on a generated random number that ensures fairness to both buyers and sellers, over time. If a transaction purchase price is N.C units, where N is any non-negative integer and C is an integer between 0 and 99 indicating the fractional cost between 0 and 0.99, then a buyer will be charged N+1 units with a probability of p equal to C/100 and N units with a probability of 1−p. The random number generation process can ensure that the rounding process does not favor buyers or sellers, for example, by (i) incorporating a buyer-provided offset, or (ii) having the generation of the random number performed or supervised by a trusted third party. The buyer can increase his or her odds of having the final purchase price rounded down by exposing more than just the amount by which the rounded up cost exceeds the fractional cost.

22 Claims, 2 Drawing Sheets

METHOD AND APPARATUS FOR CONDUCTING COINLESS TRANSACTIONS

FIELD OF THE INVENTION

The present invention relates generally to retail transaction systems, such as point-of-sale (POS) terminals, and, more specifically, to a method and apparatus for processing coinless transactions.

BACKGROUND OF THE INVENTION

In order to complete a transaction for the purchase of goods or services, the buyer and seller typically must agree on a purchase price, and the buyer must tender the purchase price to the seller. Typically, the buyer tenders the purchase price using currency (i.e., paper currency, coins or both) or some electronic form of payment, such as a credit card or debit card. When currency is utilized to pay a purchase price that is not a whole-unit amount, such as a whole-dollar amount, the buyer will often receive change back from the seller in the form of coins, and possibly paper currency, to cover the difference between the tendered amount and the purchase price. The fractional cost of the transaction is the amount that the purchase price exceeds a whole-unit amount. For example, if the purchase price for a transaction is $5.60, then the fractional cost of the transaction is sixty cents ($0.60).

While the increase in electronic transactions has greatly reduced the amount of transactions involving traditional currency, the nature of many transactions makes them unsuitable for electronic payment. Many consumers, for example, do not have access to a credit card or a debit card. In addition, the nature of many transactions makes them unsuitable for electronic payment. For example, the transaction costs associated with electronic transactions often discourage sellers from accepting electronic payment for a relatively small purchase. In addition, many point-of-sale (POS) terminals that process such transactions do not include the necessary equipment that is required to process electronic transactions, such as a card reader and a network connection to an electronic transaction processor, especially for remote POS terminals that typically process only small amounts, such as vending machines. Thus, for the foreseeable future, some percentage of transactions will continue to be paid for using traditional currency.

Buyers and sellers alike, however, do not like to deal with coins. The exchange of coins between buyers and sellers typically slows down the transaction. Sellers must maintain a sufficient amount of coinage in each possible denomination in order to provide proper change for each transaction. In addition, sellers must typically roll excess coins in order to deposit them in the bank. Buyers must deal with the inconvenience of carrying coins, and often accumulate large amounts of coins, such as in a jar or coin bank at home. Thus, the significant amount of coins that are out of active circulation at a given time requires the government to produce even greater amounts of coins, further increasing societal costs. A need therefore exists for a method and apparatus for processing coinless transactions.

U.S. Pat. No. 5,869,826 to Eleftheriou discloses a system for conducting coinless transactions that utilizes a magnetic stripe data card that interacts with a POS terminal. In the Eleftheriou system, the fractional transaction cost of a purchase is compared with an existing change balance stored on the data card. When the change balance does not cover the fractional cost of the transaction, a change renewal algorithm automatically increases the balance on the card by an amount equal to the difference between the cost of the transaction and the next highest whole dollar amount. This amount is also added to the transaction cost, raising it to the next highest whole dollar amount. Likewise, when the balance of change stored on the card does cover the fractional dollar cost of the transaction, the system provides a change depletion algorithm that automatically decreases the balance on the card by an amount equal to the fractional dollar cost of the transaction and deducts a corresponding amount from the transaction cost, lowering it to the next lowest whole dollar amount.

While the Eleftheriou system results in a whole dollar cost for the transaction and eliminates the requirement to exchange coins of any denomination for commercial transactions, the Eleftheriou system suffers from a number of limitations, which, if overcome, could further reduce the number of transactions involving coins. Specifically, the Eleftheriou system requires a buyer to carry at least one card in order to process the fractional costs of each transaction. Each buyer could conceivably be required to carry additional cards, however, if all sellers do not adopt a uniform protocol for processing fractional transaction costs in this manner. Furthermore, the Eleftheriou system requires the POS terminal to include a card reader that interacts with the data card to process the fractional transaction costs.

A need therefore exists for a method and apparatus for processing coinless transactions that does not require the buyer to carry a data card. A further need exists for a method and apparatus for processing coinless transactions that does not require the POS terminal to include a card reader.

SUMMARY OF THE INVENTION

Generally, a method and apparatus are disclosed for facilitating coinless transactions. The disclosed POS terminal rounds a fractional transaction cost up or down to a whole-unit amount and alleviates the need to exchange coins in currency-based transactions. According to one aspect of the invention, a fractional transaction cost is rounded up or down to a whole-unit amount based on a generated random number that ensures fairness to both buyers and sellers, over time. If a transaction purchase price is N.C units, where N is a non-negative integer and C is an integer between 0 and 99 indicating the fractional cost between 0 and 0.99, then a buyer will be charged N+1 units with a probability, p, equal to C/100, and N units with a probability of 1−p.

According to another aspect of the invention, the random number generation process ensures that the rounding process does not favor buyers or sellers, for example, by (i) incorporating a buyer-provided offset that guarantees that the seller cannot introduce a bias into the generated random number that favors the seller, or (ii) having the generation of the random number performed or supervised by a trusted third party.

According to another aspect of the invention, the buyer can increase his or her odds of having the final purchase price rounded down by exposing more than just the amount by which the rounded up cost exceeds the fractional cost. Thus, if a transaction purchase price is N.C units, where N is any non-negative integer and C is an integer between 0 and 99 indicating the fractional cost between 0 and 0.99, and the buyer tenders an amount of X units, where X is greater than N, then a buyer will be charged X units with a probability of (N+p)/X and zero units with a probability of 1−((N+p)/X), where, as earlier, p is equal to C/100.

A more complete understanding of the present invention, as well as further features and advantages of the present invention, will be obtained by reference to the following detailed description and drawings.

DETAILED DESCRIPTION OF EMBODIMENTS

Figure 1:
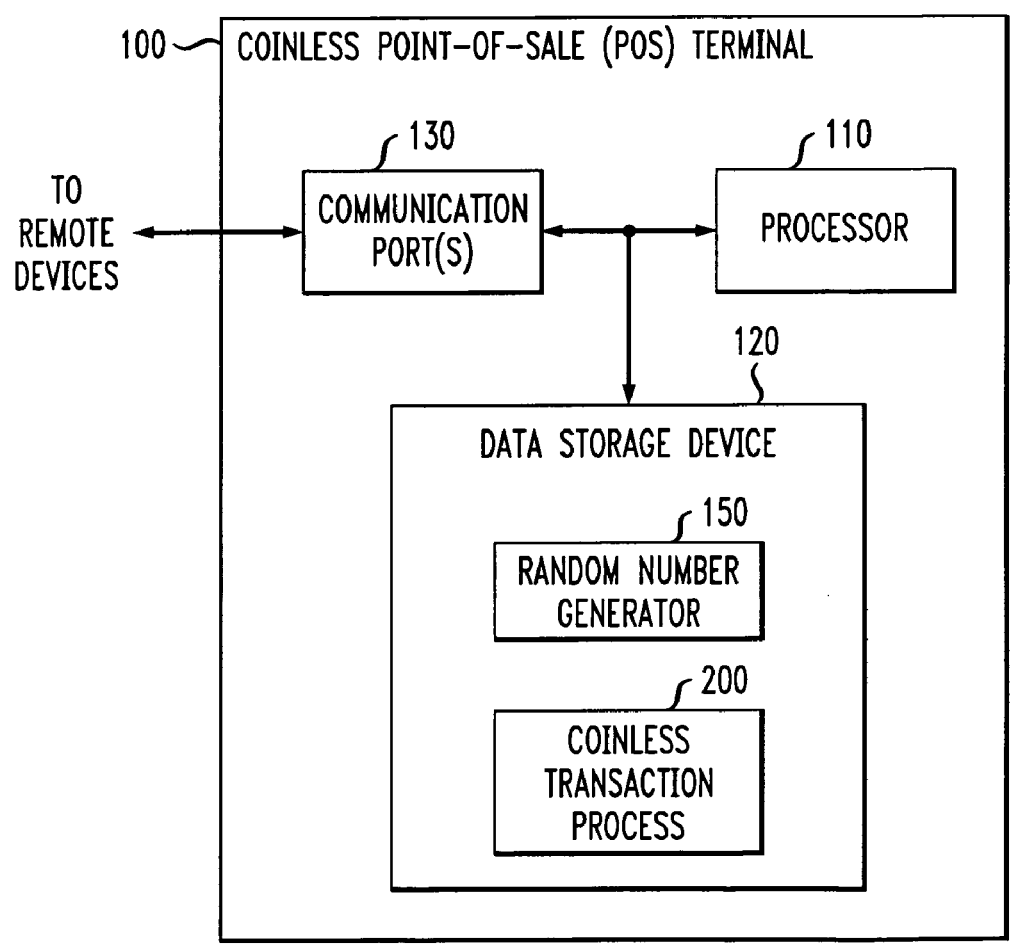
FIG. 1 is a schematic block diagram showing the architecture of an illustrative coinless point-of-sale (POS) terminal in accordance with the present invention.

FIG. 1 is a schematic block diagram of a point-of-sale (POS) terminal 100 in accordance with the present invention. According to one feature of the present invention, the POS terminal 100 facilitates coinless transactions by rounding a fractional transaction cost up or down to a whole-unit amount. In this manner, the POS terminal 100 alleviates the need to exchange coins in currency-based transactions. More specifically, the POS terminal 100 of the present invention rounds a fractional transaction cost up or down to a whole-unit amount based on a generated random number. The generated random number ensures that, on average, the rounding process does not favor either the seller or buyers.

For example, if the purchase price for a given transaction is $5.60, then the POS terminal 100 should generate a final transaction price of $5.00 with a probability of 40%, and a final transaction price of $6.00 with a probability of 60%. If a random number is generated between 0 and 99, a generated number between 0 and 59 indicates that the buyer will pay $6.00, and a generated number between 60 and 99 indicates that the buyer will pay $5.00. More generally, if a transaction purchase price is N.C units, with p equal to C/100, where N is a non-negative integer and C is an integer between 0 and 99 indicating the fractional cost between 0 and 0.99, then a buyer will be charged N+1 units with a probability of p, and N units with a probability of 1−p.

In a further variation, the random number generation process can incorporate a buyer-provided offset that guarantees that the seller cannot introduce a bias into the generated random number that favors the seller. In this manner, both the buyer and the seller alike can be certain that the generated random number is fair. Without such a buyer-provided offset, the seller could systematically build in a bias favoring himself by generating random numbers which tend to be very slightly low. The buyer-provided offset can, for example, be specified by the buyer in response to a query from the POS terminal 100 or be generated from a serial number or other numeric identifier obtained from a bill (paper currency) provided by the buyer. Thus, the random number generated by the seller (or the POS terminal 100) can be added to the buyer-provided offset, and the modulo-100 result determines whether the rounding is done in an upward or downward manner. In yet another variation, fairness can be ensured by having the generation of the random number performed or supervised by a trusted third party.

A further benefit of the buyer-provided offset is that the buyer input permits buyers to feel as if they are affecting the determination of the final purchase price. In addition, when the buyer-provided offset is obtained from a serial number or other numeric identifier obtained from paper currency, the POS terminal 100 now has control of the money, so that the buyer cannot rescind the transaction if the rounding process favors the seller.

According to another feature of the present invention, the buyer can increase his or her odds of having the final purchase price rounded down by exposing more than just the amount by which the rounded up cost exceeds the fractional cost. In other words, if a buyer is interested in purchasing an item having a cost of $0.60, and, for example, has no single dollar bills, and thus tenders a five dollar bill ($5.00), the system 100 will round the purchase price down to zero with a probability of $440/500$, or round the purchase price up to five dollars ($5.00) with a probability of $60/500$. More generally, if a transaction purchase price is N.C units, where N is any non-negative integer, C is an integer between 0 and 99 indicating the fractional cost between 0 and 0.99, and p equals C/100, and the buyer tenders an amount of X units, where X is greater than N, then a buyer will be charged X units with a probability of (N+p)/X units with a probability of 1−((N+p)/X), The POS terminal 100 may be embodied as any POS terminal, such as a personal computer in a retail environment or another device that processes transactions in which a customer tenders currency in exchange for a product (good or service). As shown in FIG. 1, the illustrative POS terminal 100 includes a processor 110, a data storage device 120 and an optional communications port 130, as modified herein to carry out the features and functions of the present invention. The processor 110 may be linked to each of the other listed elements, either by means of a shared data bus, or dedicated connections, as shown in FIG. 1. The communications port 130 optionally connects the POS terminal 100 to other remote devices, such as a central server, or credit card processing network (not shown). The communications port 130 may include multiple communication channels for simultaneously establishing a plurality of connections.

The data storage device 120 and/or ROM (not shown) are operable to store one or more instructions, discussed further below in conjunction with FIG. 2, which the processor 110 is operable to retrieve, interpret and execute. As discussed further below, the data storage device 120 includes a random number generator 150, and a coinless transaction process 200, discussed below in conjunction with FIG. 2. Generally, the random number generator 150 may be embodied as any conventional random number generator. The random number generator 150 generates a random number, giving a transaction in accordance with the present invention its probabilistic nature. The coinless transaction process 200 processes coinless transactions by rounding a fractional transaction cost up or down to a whole-unit amount.

Figure 2:
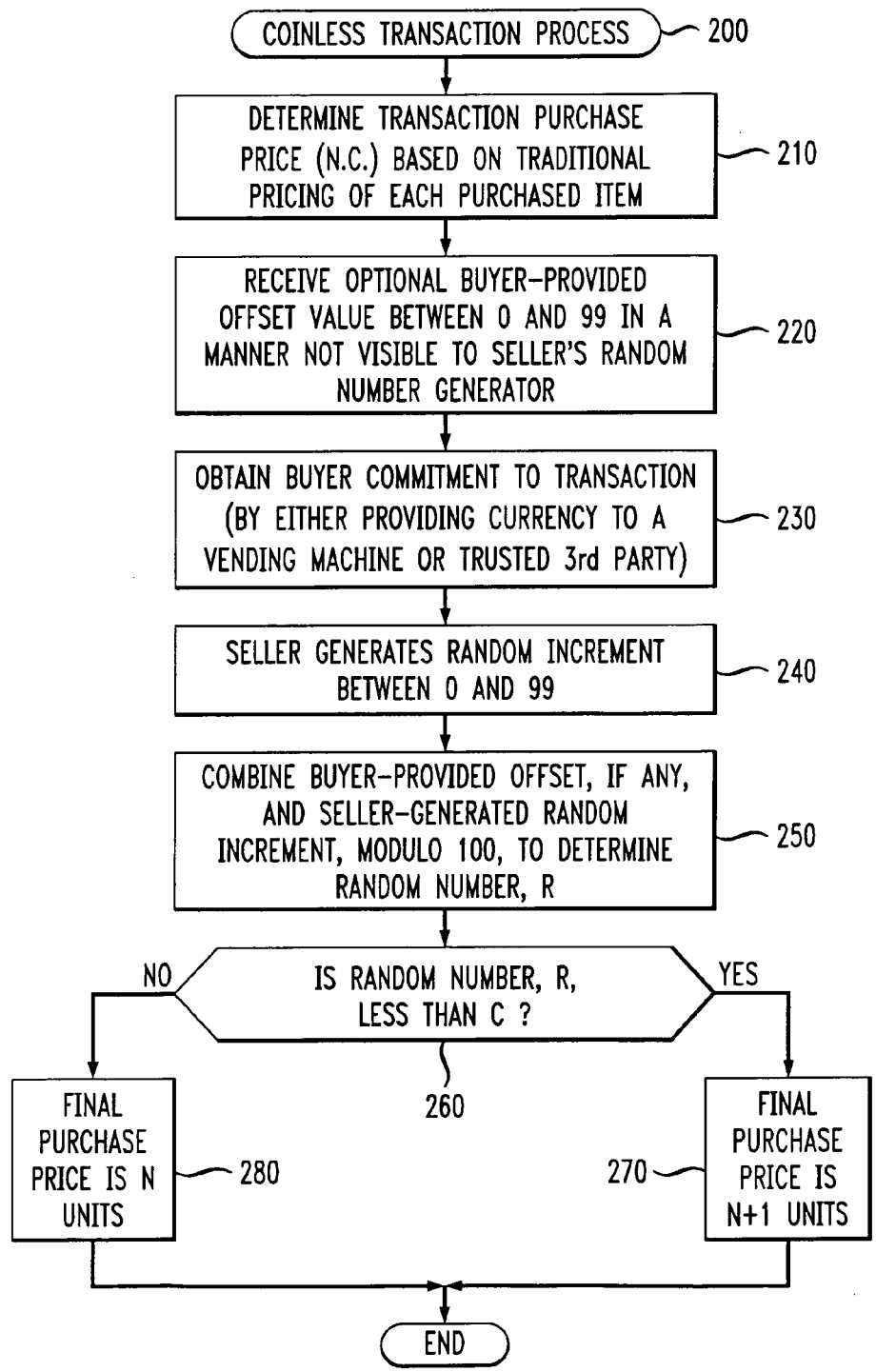
FIG. 2 is a flow chart describing an exemplary coinless transaction process incorporating features of the present invention.

FIG. 2 is a flow chart describing an exemplary coinless transaction process 200 incorporating features of the present invention. As shown in FIG. 2, the coinless transaction process 200 initially determines the transaction purchase price (N.C) during step 210, based upon traditional pricing of each purchased item.

Thereafter, the coinless transaction process 200 receives an optional buyer-provided offset value during step 220 between 0 and 99. As previously indicated, the optional buyer-provided offset value helps the buyer to ensure that the final transaction price is determined fairly. The buyer-provided offset can be specified, for example, by the buyer in response to a query from the POS terminal 100 during step 220, or it may be generated from a serial number or other numeric identifier obtained, e.g., from a bill (paper currency) provided by the buyer or from the purchased item. To achieve the desired fairness to the buyer, the offset should not be visible to the process which generates the seller-supplied random increment in step 240.

At this point (step 230), the seller should get the buyer's unequivocal commitment to the transaction, for example, by getting the buyer to tender the maximum dollar amount of the transaction. (Note, in this regard, that a refund would typically not be processed for the amount determined following random generation of the final number, but rather for the amount of the published price of the item, or perhaps by an amount determined using an independent random process.)

The coinless transaction process 200, which is typically executed by the seller, then generates a random increment between 0 and 99 during step 240. As noted in step 220, this random process should not have access to the buyer provided offset. The seller-generated value ensures that the final transaction price is calculated fairly from the seller's perspective.

The buyer-provided offset, if any, and the seller-generated increment are combined during step 250, modulo 100, to determine a random number, R, that will determine the final transaction price. A test is performed during step 260 to determine if the random number, R, is less than C.

If it is determined during step 260 that the random number, R, is less than C, then the final purchase price will be N+1 units. If, however, it is determined during step 260 that the random number, R, is not less than C, then the final purchase price will be set to N units during step 280. Program control then terminates.

It is noted that the generation of the random number, R, during steps 220 and 240 to 250 can be replaced by a single step of generating a random number, provided the buyer and seller can be satisfied that the random number is generated in a fair manner. For example, the random number can easily be generated in a fair manner if the generation of the random number is performed or supervised by a trusted third party.

For example, suppose a buyer desires to purchase a particular product from a vending machine having a purchase price of 60 cents ($0.60), and inserts a dollar bill into the vending machine. The coinless transaction process 200 generates a random number, R, in the manner described above, and will round the final purchase price down to zero if the random number is between 60 and 99 and will round the final purchase price up to one dollar ($1.00) if the random number is between 0 and 59. Once the final price is determined, and the buyer has tendered payment, if necessary, the selected product is delivered to the buyer in a conventional manner. Generally, with probability of 0.60, the buyer will be charged $1.00 and with a probability of 0.40, the buyer will be charged nothing. The expected cost to the buyer is then 60 cents, over time, so the transaction is fair.

It is to be understood that the embodiments and variations shown and described herein are merely illustrative of the principles of this invention and that various modifications may be implemented by those skilled in the art without departing from the scope and spirit of the invention.

What is claimed is:

1. A computer-based method for processing a transaction, comprising:
   determining a purchase price for said transaction, said purchase price including a fractional cost that exceeds a whole-unit amount;
   obtaining a buyer-provided offset value from an item associated with said buyer;
   obtaining a seller random number;
   combining said seller random number and said buyer-provided offset value to obtain a result; and
   rounding said purchase price up or down to a whole-unit amount based on said result, wherein said rounding is performed by said computer.

2. The method of claim 1, wherein said combining step is performed by a third party to said transaction.

3. The method of claim 1, wherein said combining step is supervised by a third party to said transaction.

4. The method of claim 1, wherein a buyer commitment to the transaction is obtained.

5. The method of claim 4, wherein said buyer commitment to the transaction is obtained by means of currency submitted to a vending machine.

6. The method of claim 4, wherein said buyer commitment to the transaction is obtained by means of currency submitted to a trusted third party prior to said combining step.

7. The method of claim 1, wherein said buyer-provided offset value is specified by the buyer in response to a query.

8. The method of claim 1, wherein said buyer-provided offset value is generated from a serial number obtained from paper currency provided by the buyer.

9. The method of claim 1, wherein said buyer-provided offset value is generated from a numeric identifier obtained from a product associated with said transaction.

10. The method of claim 1, wherein the seller random number is made without access to said buyer-provided offset value.

11. A computer-based method for processing a transaction, comprising:
    determining a purchase price, N.C, for said transaction, said purchase price including a fractional cost equal to C/100, that exceeds a whole-unit amount, N;
    obtaining a buyer-provided offset value from an item associated with said buyer;
    obtaining a seller random number;
    combining said seller random number and said buyer-provided offset value to obtain a result; and
    rounding said purchase price up to a price of N+1 units with a probability of p and down to a price of N units with a probability of (1−p), wherein probability p equals C/100 and wherein said rounding is based on said result and is performed by said computer.

12. The method of claim 11, wherein said combining step is performed in a manner that prevents a bias towards a buyer or seller.

13. The method of claim 11, further comprising the step of obtaining a buyer commitment to the transaction.

14. A computer-based method for processing a transaction, comprising:
    determining a purchase price, N.C, for said transaction, said purchase price including a fractional cost equal to C/100, that exceeds a whole-unit amount, N;
    receiving an amount of X units from a buyer, where X is greater than N;
    obtaining a buyer-provided offset value from an item associated with said buyer;
    obtaining a seller random number;
    combining said seller random number and said buyer-provided offset value to obtain a result; and
    rounding said purchase price up to a price of X units with a probability of ((N+p)/X) and down to a price of zero units with a probability of 1'1((N+p)/X), wherein probability p equals C/100, and wherein said rounding is based on said result and is performed by said computer.

15. The method of claim 14, wherein said combining step is performed in a manner that prevents a bias towards a buyer or seller.

16. The method of claim 14, further comprising the step of obtaining a buyer commitment to the transaction.

17. A system for processing a transaction, comprising:
a memory that stores computer-readable code; and
a processor operatively coupled to said memory, said processor configured to implement said computer-readable code, said computer-readable code configured to:
determine a purchase price for said transaction, said purchase price including a fractional cost that exceeds a whole-unit amount;
obtain a buyer-provided offset value from an item associated with said buyer;
obtain a seller random number;
combine said seller random number and said buyer-provided offset value to obtain a result; and
round said purchase price up or down to a whole-unit amount based on said result.

18. The system of claim 17, wherein said random number and said buyer-provided offset value are combined in a manner that prevents a bias towards a buyer or seller.

19. The system of claim 17, wherein said processor is further configured to obtain a buyer commitment to the transaction.

20. The system of claim 17, wherein said purchase price, N.C, for said transaction includes a fractional cost equal to C/100, that exceeds a whole-unit amount, N, and said purchase price is rounded up to a price of N+1 units with a probability of p and rounded down to a price of N units with a probability of (1−p), wherein probability p equals C/100.

21. The system of claim 17, wherein said purchase price, N.C, for said transaction includes a fractional cost equal to C/100, that exceeds a whole-unit amount, N and wherein an amount of X units is received from a buyer, where X is greater than N, and wherein said purchase price is rounded up to a price of X units with a probability of ((N+p)/X) and rounded down to a price of zero units with a probability of 1−((N+p)/X), wherein probability p equals C/100.

22. An article of manufacture for processing a transaction, comprising:
a computer readable medium having computer readable code means embodied thereon, said computer readable program code means comprising:
a step to determine a purchase price for said transaction, said purchase price including a fractional cost that exceeds a whole-unit amount;
a step to obtain a buyer-provided offset value from an item associated with said buyer;
a step to obtain a seller random number;
a step to combine said seller random number and said buyer-provided offset value to obtain a result; and
a step to round said purchase price up or down to a whole-unit amount based on said result.

* * * * *